United States Patent [19]
Klever et al.

[11] Patent Number: 4,738,088
[45] Date of Patent: Apr. 19, 1988

[54] LAWN TRACTOR WITH A REAR MOUNTED GRASS CATCHER

[75] Inventors: Manfred Klever, Saarbrücken-Scheidterberg; Karl-Heinz Rott, Saarbrücken-Bübingen, both of Fed. Rep. of Germany

[73] Assignee: Gutbrod-Werke GmbH Industriegelande, Saarbrucken-Bubingen, Fed. Rep. of Germany

[21] Appl. No.: 905,404

[22] Filed: Sep. 10, 1986

[30] Foreign Application Priority Data

Sep. 13, 1985 [DE] Fed. Rep. of Germany ....... 3332700
Dec. 6, 1985 [DE] Fed. Rep. of Germany ....... 3543165

[51] Int. Cl.$^4$ .................... A01D 34/70; A01D 34/48
[52] U.S. Cl. ........................... 56/202; 56/16.6
[58] Field of Search ...................... 56/202, 16.6

[56] References Cited

U.S. PATENT DOCUMENTS

| | | | |
|---|---|---|---|
| 3,708,968 | 1/1973 | Enters et al. | 56/202 |
| 3,716,977 | 2/1973 | Jackson | 56/202 |
| 3,958,401 | 5/1976 | Carpenter | 56/202 |
| 3,961,467 | 6/1976 | Carpenter | 56/202 |
| 3,971,198 | 7/1976 | Lane | 56/202 |
| 3,999,316 | 12/1976 | Palmer | 56/202 |
| 4,047,368 | 9/1977 | Peterson | 56/202 |
| 4,106,272 | 8/1978 | Peterson et al. | 56/202 |
| 4,168,600 | 9/1979 | Klug et al. | 56/16.6 |
| 4,393,645 | 7/1983 | Moore | 56/202 |
| 4,522,019 | 6/1985 | Edwards et al. | 56/16.6 |
| 4,532,755 | 8/1985 | Schemelin et al. | 56/16.6 |
| 4,532,756 | 8/1985 | Merkel | 56/16.6 |
| 4,637,202 | 1/1987 | Lamusga | 56/202 |

*Primary Examiner*—Paul J. Hirsch
*Attorney, Agent, or Firm*—Holman & Stern

[57] ABSTRACT

The four-wheel lawn tractor has a rear mounted detachable grass catcher bag to collect the grass clippings conveyed by a discharge conduit emerging and extending upwardly from the worm type mower housing. The discharge conduit is left open at the bottom side whereby its length, slope and turn and also the blower capacity are designed according to flow codes that will permit grass clippings to be conveyed uninterruptedly and turbulence-free through to the outlet end of the discharge conduit. The outlet end of the discharge conduit is disposed below a swivel shaft of a catcher hood covering the top of a catcher bag in its horizontal swivel position. If the catcher bag is removed, the catcher hood may be swung in a vertical hanging position transverse to the outlet end of the discharge conduit permitting a mulching operation of the lawn tractor in which the clippings drop down on the lawn surface.

10 Claims, 5 Drawing Sheets

LAWN TRACTOR WITH A REAR MOUNTED GRASS CATCHER

BACKGROUND OF THE INVENTION

1. Field of the Invention

The invention relates to a lawn tractor which includes a worm type mower housing and a mower mechanism arranged between the four traction wheels, the rotary mower blade thereof being provided with air vanes or the like formed thereon for conveyance of grass clippings, a discharge conduit extending upwardly to a rear mounted detachable grass catcher bag, and a grass catcher hood pivotally mounted on a horizontal swivel shaft to cover the top of the bag in its horizontal swivel position.

2. Background of the Invention

Since the undercarriage necessarily provided on four-wheel lawn tractors requires the mower mechanism and the rear mounted grass catcher bag to be spaced relatively far apart, the discharge conduit of the mower housing is designed to form an enclosed conduit behind its spiral section in order to permit optimum utilization of the blowing capacity of the rotary air-vane type mower blade for conveyance of the grass clippings. However, an enclosed discharge conduit is very likely to become plugged especially when grass clippings are not completely dry and, very often, the catcher bag will not receive the full fill as would be desirable for the economical operation of a lawn tractor.

As prior art, German patent reference No. DE 34 06 606 A1 should first be mentioned, although it is less concerned with the grass clipping conveyance problem. The dynamics of grass clipping conveyance are more fully discussed in U.S. Pat. Nos. 4,532,755 and 4,106,272 which describe measures for preventing generation of back pressure in the discharge conduit, which may cause plugging thereof. Basically, these measures consist in giving the grass conveying air a chance to escape into the open after the airstream enters underneath the cover or grass catcher hood without letting the grass escape along with the air. Thus, it is known to provide the cover with a screen-like outlet at a suitable point somewhere aside from the path of the forced airstream so as to prevent escapement of the grass clippings, yet permitting air discharge. The simplest method of discharging air without simultaneous discharge of grass clipping consists in the use of a permeable catcher bag (European patent reference No. EP 72 572 A1), corresponding to U.S. Pat. No. 4,393,645. This method, however, requires the bag to be made of textile fabric, a costly material, and is thus unsuitable for throw-away bags. German patent reference No. DE 25 37 120 A1, corresponding to U.S. Pat. No. 3,958,401, therefore recommends insertion of an impermeable collecting bag of synthetic material into an external permeable bag to create an expansion zone for inflowing air underneath the cover. Grass clippings are conducted into the internal collecting bag, whereas the air is permitted to escape through the space present between the two interfitted bags and through the external permeable bag. In this case, the internal collecting bag may be of throw-away bag construction.

The difficulties inherent in grass clipping conveyance is particularly evident on lawn tractors featuring grass discharge from the side of the mower housing and, accordingly, with a discharge conduit extending laterally upwardly as disclosed in U.S. Pat. No. 4,532,755, European patent reference No. EP 72 572 A1 and German patent reference No. DE 25 37 120 A1, as far as the latter actually describes an automotive lawn tractor.

BRIEF SUMMARY OF THE INVENTION

Therefore, one object of the present invention is to prevent generation of back pressure inside the discharge conduit of a lawn tractor without the need for an air discharge opening in the cover or grass catcher hood and without the necessity of using a permeable type grass catcher bag.

In addition, U.S. Pat. No. 4,532,755 and European patent reference No. EP 72 572 A1 include a considerable shortcoming with reference to the curved discharge conduit extending outside the configuration of the lawn tractor vehicle, this shortcoming consisting in the fact that the pivotable cover or catcher hood must be provided with a recess for insertion of the tubular discharge conduit to permit the cover to be swung into its horizontal position for closing the top of the grass catcher bag(s). Such recess requires sealing due to its close position to the opening of the discharge conduit.

Therefore, another object of this invention is to provide means which will permit passage of the grass clippings into a catcher bag strictly in free-dropping style, without requiring the discharge conduit to extend through a recess in the catcher hood.

A further disadvantage of lawn tractors using a discharge conduit alongside the vehicle is that mowing without collection of the clippings in one or two catcher bag(s) can only be carried out upon removal of the lateral discharge conduit. Clippings are then blown sideways onto the cut lawn surface in an uncontrolled manner.

Therefore, a still further object of this invention is to arrange a rearwardly discharging lawn tractor such that mowing operation without a catcher bag will permit grass clippings to drop down freely and orderly behind the lawn tractor. At times, such method of leaving the cut grass on the ground may be considered desirable for soil humidity and structure preserving purposes.

With this background in mind, the present invention primarily increases the economic efficiency of a lawn tractor using a rear mounted catcher bag by substantially eliminating back pressure in the discharge conduit and, thus, plugging thereof. According to the invention, this problem is solved by designing the outlet end of the discharge conduit emerging from the worm type mower housing to terminate below the catcher hood swivel shaft which is positioned to extend transversely to the direction of tractor travelling motion, and by leaving the bottom of the conduit open up to its outlet end, whereby the length, slope and turn of the conduit and also the blower capacity of the rotary mowing blade are designed according to flow codes that will permit grass clippings to be conveyed uninterruptedly through to the outlet opening end.

Accordingly, the invention not only presents a method of moving the grass clipping in a flow motion free from turbulence, thus, preventing the clippings from settling against the upper wall section of the open-bottom discharge conduit but, additionally, the opening along the bottom of the discharge conduit will permit escapement of the air as it comes clear of the clippings. This obviates the need for special openings in the grass catcher hood and permits the use of impermeable throw-away type grass catcher bags. From the outset, the uninterrupted flow feature will prevent development of any back pressure in the open-bottom discharge conduit. For non-interruption in the conveyance of grass clippings, it is recommendable to have the upper wall section of the discharge conduit slope upwardly at a steady angle of inclination.

Since the outlet end of the discharge conduit is disposed to terminate below the catcher hood swivel shaft extending transversely to the direction of tractor motion, the catcher hood may be optimally designed for good catcher bag filling results. Considering that the grass clippings blown upwardly at a slant will strike against the catcher hood at an angle, chances are that the clippings may reverberate, causing the catcher bag to fill unevenly and leaving part of its volume unutilized.

To avoid such incidence and to aid the clippings in dropping down evenly over the cross sectional area of the catcher bag, the invention further provides the last third of the upper wall section of the ascending discharge conduit with an upwardly shaped curvature and the catcher hood with a curved bulge, the center of curvature of which is allocated to the inside of the catcher hood and which commences along the curved vanishing line of the upper wall section of the conduit when the catcher hood is in its horizontal swivel position. In this manner, the upwardly directed flow of clippings discharging from the conduit will follow the curvature of the bulge and deflect without reverberation, and the clippings will drop down evenly over the area of the catcher bag. The effect described is further supported by a certain vortex motion caused by the curved bulge in the catcher hood.

The curvature in the upper wall section of the discharge conduit, which is opposed to the curved bulge of the catcher bag, is advantageously based on an exponential function. In terms of flow codes, this means that a certain amount of underpressure will be present in the area of the outlet end of the discharge conduit near its upper wall section. A substantial portion of the clippings is thereby conducted upwardly and forced into the path leading along the curved bulge of the catcher hood. In this manner, the bulk of the clippings is passed into the catcher bag strictly in free dropping style and in even distribution.

A further result of the inventive feature concerning the location of the discharge conduit outlet end below the horizontal swivel shaft of the catcher hood, is that the catcher hood, no longer provided with an air outlet screen, may be swung into a vertical hanging position in front of the outlet end of the discharge conduit when mowing is to take place without the catcher bag, thereby permitting clippings to drop down freely and orderly on to the cut lawn surface. For this purpose and as an advancement of FIG. 3 in European patent reference No. EP 72 572 A1, supporting means for the catcher bag is provided which permits the horizontal bracket arms positioned in known manner in parallel spaced relationship in the direction of tractor travelling motion and designed to fit into hose-like catcher bag receiving means, to be removed from the swivel path of the catcher hood so as to permit the hood to be swivelled into a vertical hanging position. Again referring to the lawn tractor described in the literature, although its supporting means for two catcher bags in side-by-side position may be removed from the swivel path of the cover, the cover still cannot be swung into a vertical hanging position due to the fact that it is required to accommodate the enclosed discharge conduit through a side recess.

To give account to the deflection of flow motion and to the curved bulge in the catcher hood, the vertical hanging position of the catcher hood, which is transverse to the outlet end of the discharge conduit, involves special measures for the sealing of an unavoidable horizontal gap between the end of the discharge conduit and the beginning of the curved bulge in the horizontal catcher hood position. According to the invention, a fixedly mounted lining means is provided for this purpose, extending across the width of the hood and shaped to curve around the center of curvature of the swivel shaft of the catcher hood to environ the swivel shaft in the direction of the driver's seat. A rearward edge section of the catcher hood grasps around the lining means to produce a sealing effect in each swivel position of the hood.

BRIEF DESCRIPTION OF THE DRAWINGS

Further features of the invention concerning the design of the grass catcher hood and the catcher bag supporting means will now be described with reference to the accompanying drawings showing an example of a lawn tractor embodying the invention wherein.

DETAILED DESCRIPTION OF PREFERRED EMBODIMENT OF THE INVENTION

Figure 1:
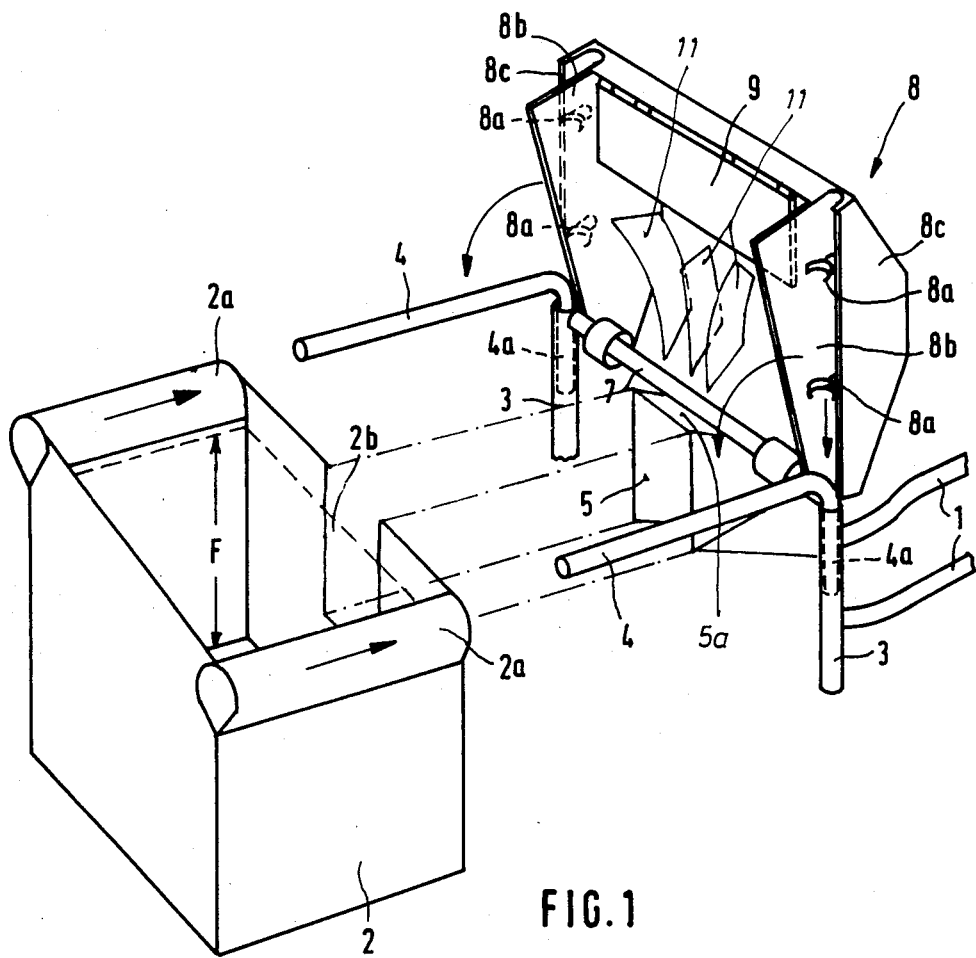
FIG. 1 is a diagrammatic exploded view of the rear section, to more closely explain the seating means for the grass catcher hood and the supporting means for the throw-away bag.
Figure 2:
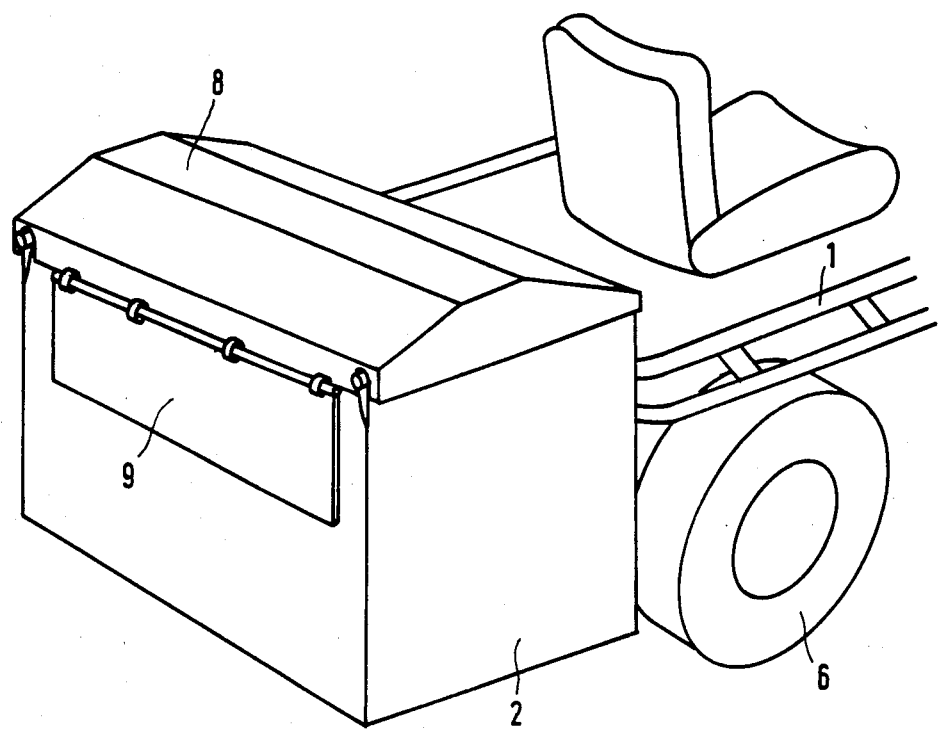
FIG. 2 is a diagrammatic view of the rear vehicle section with the throw-away bag in its suspended ready position.
Figure 3:
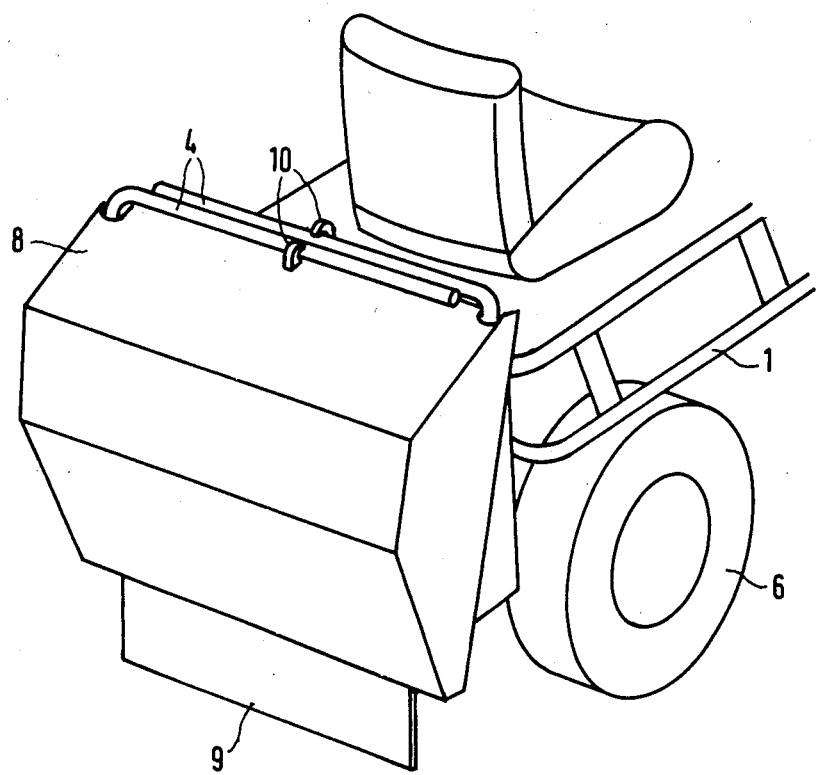
FIG. 3 is the view shown in FIG. 2, but without the throw-away bag and with the catcher hood in its vertical hanging position.

The carriage of the vehicle as shown in FIGS. 2 and 3 consists of a tubular frame 1 provided with two vertical rear-end guide tubes 3 spaced to coincide with the width of the throw-away bag 2 for insertion of the arm sections 4a extending angularly from horizontal bracket arms 4. The bent-down arm sections 4a may be revolved in the guide tubes 3 which permits pivoting motion of the bracket arms 4 in the horizontal plane. In the swivel position shown in FIG. 1, the bracket arms run parallel to one another and may be threaded into hose-shaped receiving means 2a arranged on two parallel upper edges of the throw-away bag 2.

One wall section of the bag 2 defines an opening 2b for entry of the end of the open-bottom discharge conduit 5 at a position between the two guide tubes 3 in FIG. 1, when the bag 2 is in the receiving position shown in FIG. 2. The upper horizontal conduit wall section 5a should preferably terminate at a level somewhat above the catcher bag 2 for attainment of the optimum filling height F.

The outlet end of the conduit 5 is positioned relatively high, so that clippings are passed into the catcher bag by gravity only. Furthermore, the worm-shaped discharge conduit 5 of the mower housing 12 (FIGS. 4 and 5) which is disposed to reach between the rear traction wheels 6, has an open-bottom over the entire length of its development and is designed in conformity with flow code requirements to windingly slope upwards in such a manner that the blowing effect of the rotary mower blade 14 provided with air vanes 13 permits uninterrupted passage of clippings up to the outlet end shown in FIG. 1. Advantageously, the discharge conduit 5, the so-called worm of which actually commences in the mower housing, should be straight in its development which would be equivalent to a steady slope.

Figure 4:
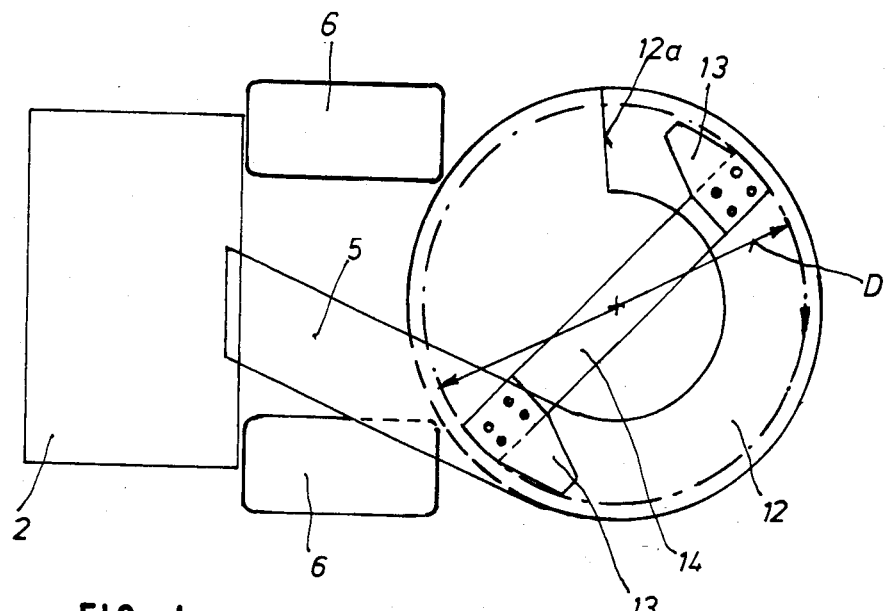
FIG. 4 is a schematic top plan view of the rear section with the mower housing in schematic outline.
Figure 5:
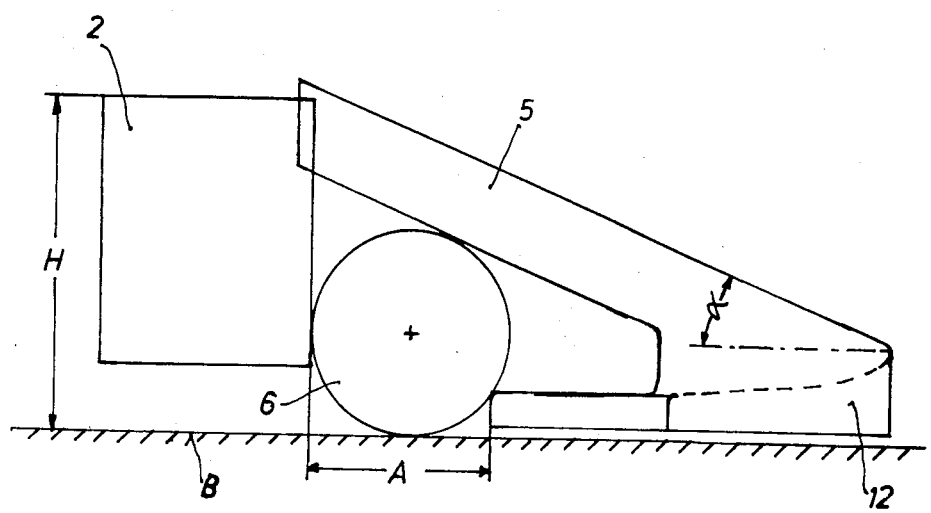
FIG. 5 is a schematic side elevational view of FIG. 4 to illustrate the slope of the discharge conduit.

A few parameters shown in FIGS. 4 and 5 are essential for uninterrupted clipping conveyance, i.e. a conveyance free from turbulance within the open-bottom discharge conduit 5. Starting from the point at which the conduit 5 emerges from the mower housing 12, the conduit is designed straight at a steady angle of inclination $\alpha$. Further, the conduit should be maintained as short as possible within this area and, for this purpose, the mower housing 12 is positioned sufficiently close to the rear of the vehicle to have part of it reach between the rear wheels 6. The blade circle diameter D and/or the width between the wheels must be selected accordingly. In view of the position of the outlet end which should be as high as possible above ground B (dimension H in FIG. 5), the short distance A (FIG. 5) between the mower housing 12 and the end of the conduit requires proper configuration of the spiral section of the conduit, the so-called worm commencing approximately at the line 12a in the example shown in FIG. 4. Thus, the rise of the spiral and of the subsequent discharge conduit 5 is rather steep. Furthermore, the mower housing 12 and the conduit (giving account to the open bottom of the conduit) should advantageously be made of one plastic injection molded piece. The internal wall of the conduit 5 will then remain smooth and rustless which also aids in preventing adherence of clippings and plugging of the conduit.

A horizontal swivel shaft 7 is provided between the two guide tubes 3 of tubular frame 1 immediately above the outlet end of the discharge conduit 5 for swivel motion of a catcher hood 8. In FIG. 1, the catcher hood is in its upward swivel position in which the horizontal bracket arms 4 will come clear for entry into the hose-like receiving means 2a of the throw-away type catcher bag 2. As shown, semi-circular cup-shaped supporting shoulders 8a are provided on either side of the catcher hood 8. In the horizontal swivel position of the hood 8 in FIG. 2, these shoulders will come to rest on the insertedly positioned hose-like receiving means 2a and will clamp the catcher bag 2 in place. In the example, the supporting shoulders 8a are shaped semi-circular because they are to partially grasp around the circular bracket arms 4.

The catcher hood 8 is provided with radially positioned side walls 8b. In the horizontal swivel position of the catcher hood 8, these side walls will come to lie inside the suspendedly mounted catcher bag 2, improving its stability. Together with its neighboring outer side wall 8c, each side wall 8b forms an adjusting channel, the supporting shoulders 8a of which are recessed in a position which, as the catcher hood 8 lowers, will permit parallel adjustment of the bracket arms 4 before the shoulders reach their clamping positions. In this manner, any deviation from the parallel position of bracket arms 4 is automatically adjusted upon attachment of catcher bag 2.

The clear edge of the catcher hood 8, running parallel with the swivel shaft 7, is provided with a free-swinging baffle plate 9 which will remain in its vertical hanging position in whichever swivel position the catcher hood may be, and which is shorter in width than the clear span of the catcher bag 2. When mowing with the catcher bag, this baffle plate 9 will be hanging down outside the bag as shown in FIG. 2.

The inside of the catcher hood 8 defines three air guide ribs 11. The horizontal closing position of the catcher hood will position these ribs to commence at a point just ahead of the outlet end of the discharge conduit 5 for even distribution of the clippings over the horizontal cross sectional area of the catcher bag 2.

FIG. 3 illustrates the situation when mulching without the catcher bag. Catcher hood 8 is in its vertical hanging position transverse to the outlet end of the conduit 5, permitting clippings to be blown against the catcher hood 8 and to drop down on the lawn surface. In extension of the catcher hood, the baffle plate 9 will be hanging down in free swinging fashion and will also guard against spattering stones.

The vertical hanging position of the hood shown in FIG. 3 requires removal of the two bracket arms 4 from guide tubes 3; by reinserting these arms tranversely to the travelling direction of the lawn tractor (FIG. 3), both or at least one of the bracket arms 4 may now be used for securing the catcher hood 8 in its vertical hanging position. For this purpose, the catcher hood 8 is provided with an external spring catch 10 in the vicinity of its swivel seating on shaft 7, to secure at least one of the bracket arms 4 upon transverse insertion of its arm section 4a (FIG. 1) into the guide tube 3.

Figure 6:
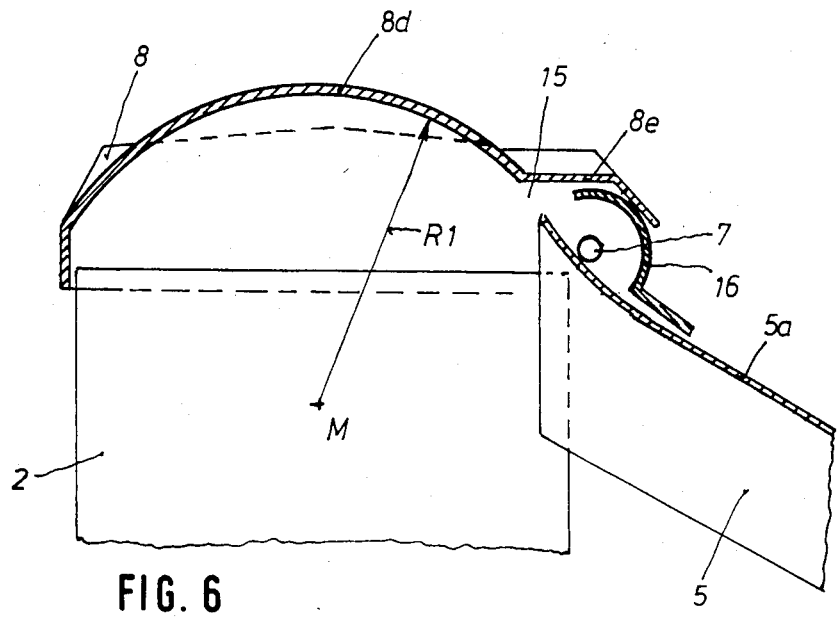
FIG. 6 is a schematic cross-sectional view of the catcher hood in its horizontal swivel position, showing the rear portion of the discharge conduit taken on the plane of line I—I in FIG. 7.
Figure 7:
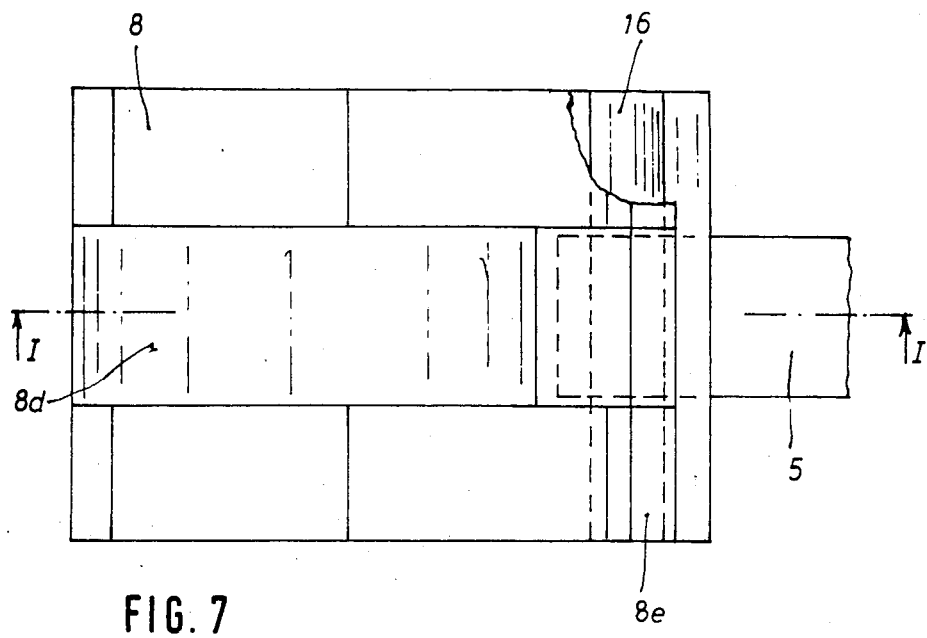
FIG. 7 is a top plan view of FIG. 6, with part of the catcher hood being cut away.

In the area of its outlet end, the last portion of the discharge conduit 5 in FIG. 6 is shown to partially project into the catcher bag 2, the last third of its wall section 5a curving upwardly in accordance with an exponential function. The catcher hood 8 which may be pivoted about the horizontal swivel shaft 7, is shown in its horizontal position covering catcher bag 2. In extension of the discharge conduit 5, the center area of the catcher hood 8 defines a curved bulge 8d, its center of curvature M being allocated to the inside of the hood. The radius of curvature R1 of the bulge 8d and its center of curvature M have been selected to let the curved bulge 8d commence in the curved vanishing line of the upper wall section 5a of discharge conduit 5, whereby a gap 15 gives account to design requirements in providing space for the vertical hanging position of catcher hood 8. The upward curvature of the upper wall section 5a of conduit 5 will direct the flow of the clippings to concentrate upwardly and unreverberatingly into the path determined by the curvature of the bulge 8d. The flow energy inherent in the clippings is destroyed or converted to dropping energy by the vortex motion and friction of the clippings against the bulge 8d and by the effective gravitational forces, so that the clippings will drop down by gravity and in proper distribution over the cross-sectional area of the catcher bag 2.

To prevent clippings from escaping outwardly through the unavoidable gap 15, the swivel shaft 7 of the catcher hood 8 is environed by a fixedly mounted lining means 16 in the direction of the driver's seat (towards the right in FIG. 6), extending across the width of the catcher hood and shaped to curve around the center of curvature of the swivel shaft. A rearward edge section 8e of the catcher hood is disposed to grasp around this lining means, also in the area of the bulge 8d, to ensure a sealing effect between the edge section 8e and the fixedly mounted lining means 16 in each swivel position of the catcher hood 8.

We claim:

1. In the combination of a grass catcher and a lawn tractor having four wheels, a worm type mower housing and a mower mechanism including rotary mower blade means arranged between the wheels, the improvement comprising:

air vanes on the rotary blade means for blowing grass clippings;

a grass discharge conduit having an entry end connected to the worm type housing and communicating with the interior of the housing for receiving said grass clippings therefrom;

said conduit extending generally rearwardly relative to said housing and upwardly into a rear mounted detachable grass catcher bag;

bag mounting means on the tractor for detachably mounting a grass catcher bag at the rear of the tractor comprising a frame supported on the tractor;

a detachable grass-catcher bag detachably mounted on said bag mounting means, said bag having an open upper end and a conduit-receiving opening adjacent said upper end;

a substantially horizontal hood-mounting shaft on said bag-mounting means extending substantially transversely relative to the direction of travel of the tractor;

a grass-catcher hood pivotally mounted on said hood-mounting shaft and adapted when in a substantially horizontal position to cover said open upper end of said grass catcher bag;

a rear outlet end portion on said conduit disposed below said hood-mounting shaft and having an outlet end communicating with the interior of said grass-catcher bag via said conduit-receiving opening;

said grass-discharge conduit having an open bottom extending the full length thereof; and removable brackets removably supported on said frame so that in the installed position said brackets support said bag and said hood when said hood is in the bag-covering position on said upper open end of said bag, and in the removed position allow said hood to move pivotally about said shaft to a downwardly-hanging position covering said outlet end of said conduit in spaced relation thereto;

said discharge conduit having a shape and size and the blowing capacity of said rotary blade being sufficient to propel and convey grass clippings free of turbulence and interruption from the housing through said outlet end of said conduit so that no back pressure is produced in said conduit.

2. The improvement in a lawn tractor and grass catcher combination as claimed in claim 1 wherein:

said conduit comprises an upper wall section extending substantially from the housing at a constnt angle of inclination for substantailly the entire length of said conduit.

3. The improvement in a lawn tractor and grass catcher combination as claimed in claim 2 and further comprising:

an upwardly-extending curved configuration on substantially the upper third portion of said upper wall of said conduit; and a concave curved inner surface configuration on said hood having a center of curvature located within said bag, when said hood is in the covering position on said bag, and commencing in adjacent spaced relationship from the upper end of said upper wall portion when said hood is in said covering position.

4. The improvement in a lawn tractor and grass catcher combination as claimed in claim 3 wherein:

said curved configuration on said upper wall of said conduit is based on an exponential function.

5. The improvement in a lawn tractor and grass catcher combination as claimed in claim 3 and further comprising;

a lining member having a curved cross-sectional configuration mounted in spaced relationship with respect to said shaft and extending substantially the full length of said shaft for covering at least part of the area around said shaft on the side thereof opposite said conduit; and a sealing edge section on said hood extending substantially the length of and adjacent and spaced from said shaft and projecting from said hood and over at least a part of said curved lining member in any pivotal position of said hood about said shaft for substantially sealing the space between said hood, said upper end portion of said conduit and said lining member.

6. The improvement in a lawn tractor and grass catcher combination as claimed in claim 5 and further comprising:

a baffle plate hingedly mounted at one edge thereof on the rear edge of said hood opposite to said sealing edge and having a width in the direction perpendicular to said one edge of a size so that when said hood is in said downwardly hanging position said baffle plate extends from said hood downwardly towards the ground for shielding matter thrown by the rotary blade means.

7. The improvement in a lawn tractor and grass catcher combination as claimed in claim 5 wherein:

said frame comprises a plurality of spaced substantially vertical support tubes; and said brackets comprise arm members telescopingly engageable in said support tubes and having horizontally-extending portions telescopically engageable with tubular connectors on said bag.

8. The improvement in a lawn tractor and grass catcher combination as claimed in claim 7 and further comprising:

crescent-shaped supporting members on said hood positioned to removably engage around at least part of said horizontally-extending portions of said brackets when said hood is in said covering position for supporting said hood and clamping said tubular connections on said bag to said brackets for returning said bag in position during use.

9. The improvement in a lawn tractor and grass catcher combination as claimed in claim 8 wherein:

two sidewalls are provided on said hood, each sidewall comprising spaced sidewall members forming a bracket-engaging channel means therebetween; and said crescent-shaped supporting members are disposed in said channel means so that said bracket-engaging channel means engages said brackets and tubular bag connectors thereon when said hood is rotated into said covering position for positioning said brackets prior to engagement of said crescent-shaped supporting members in clamping position on said brackets.

10. The improvements in a lawn tractor and grass catcher combination as claimed in claim 7 and further comprising;

spring catch means on said hood adjacent said shaft for releasably engaging at least one of said brackets when positioned in a respective tubular support with said horizontally-extending portion extending over the outer surface of said hood for securing said hood in said downwardly hanging position.

* * * * *